Figure 5:
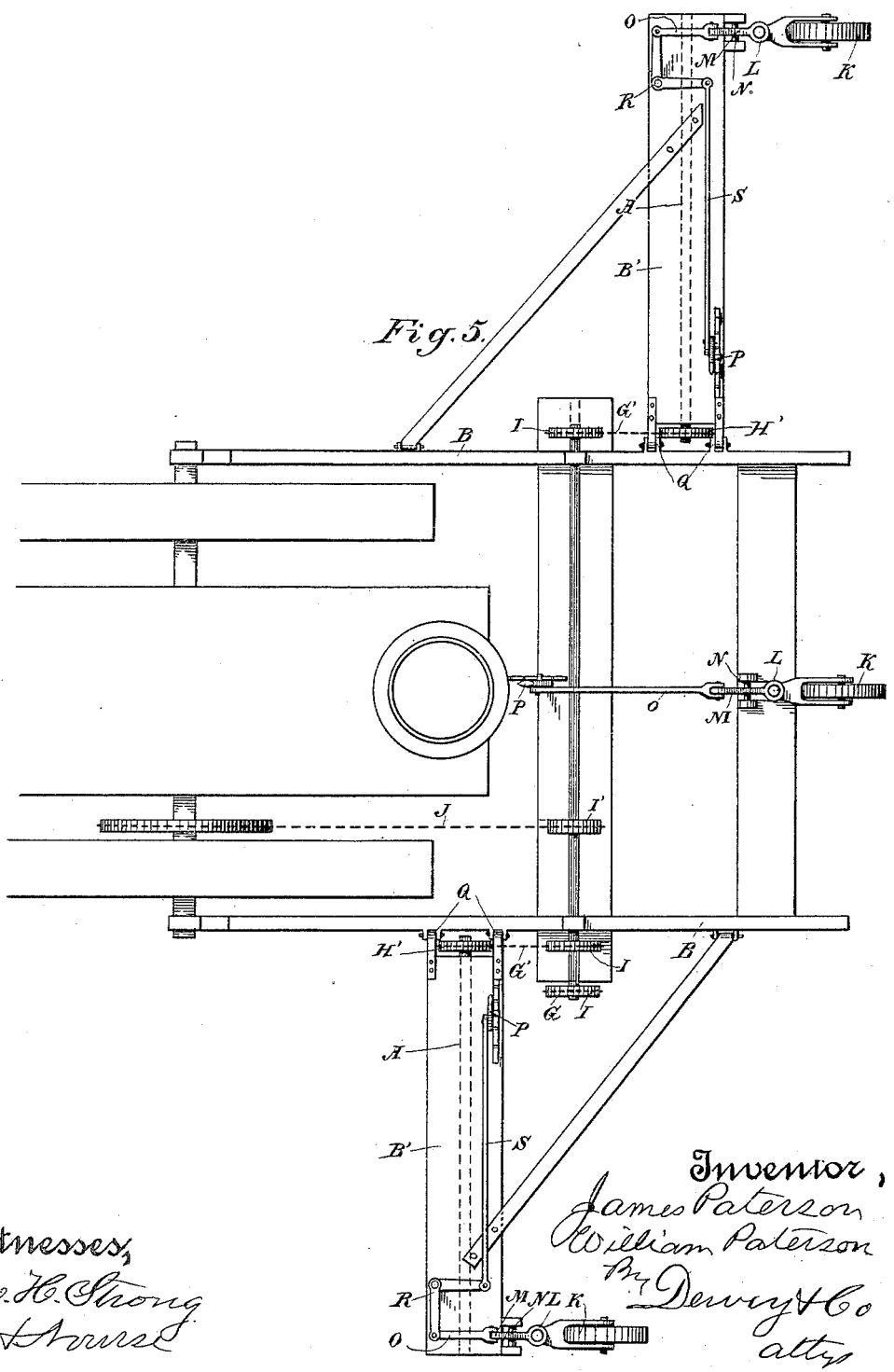

(No Model.)  J. & W. PATERSON.  2 Sheets—Sheet 1.
PLOW.
No. 398,648.  Patented Feb. 26, 1889.
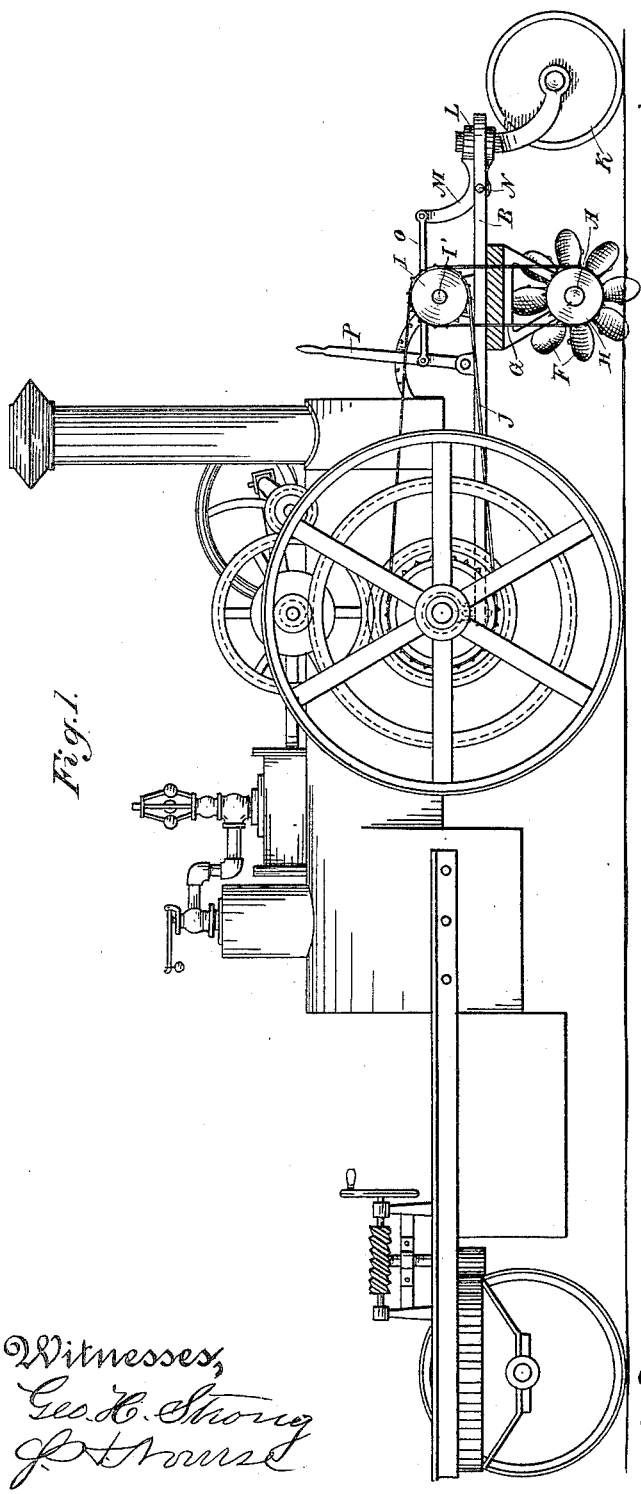
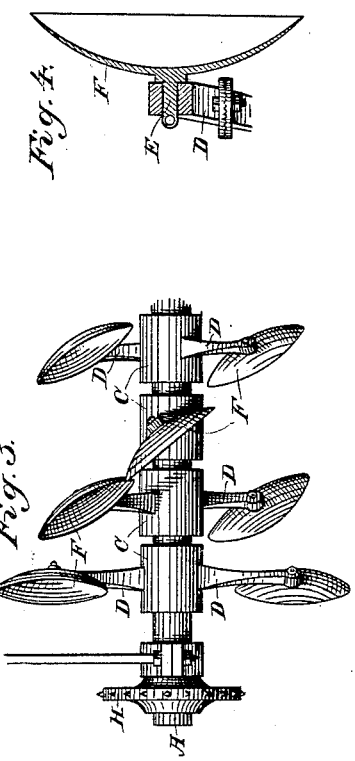
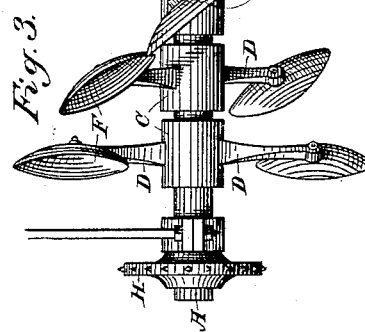
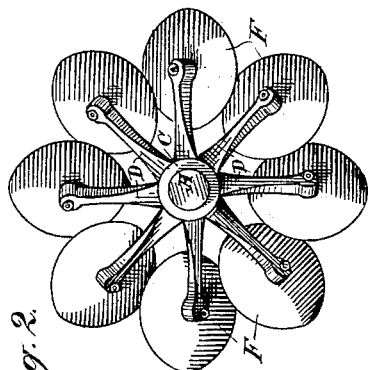
Witnesses,
Geo. H. Strong
Inventor,
James Paterson
William Paterson
By Dewey & Co.
Attys (No Model.) 2 Sheets—Sheet 2.

J. & W. PATERSON.
PLOW.

No. 398,648. Patented Feb. 26, 1889.

Witnesses,
Geo. H. Strong

Inventor,
James Paterson
William Paterson
By Dewey & Co
attys

UNITED STATES PATENT OFFICE.

JAMES PATERSON AND WILLIAM PATERSON, OF STOCKTON, CALIFORNIA.

PLOW.

SPECIFICATION forming part of Letters Patent No. 398,648, dated February 26, 1889.

Application filed November 10, 1888. Serial No. 290,483. (No model.)

*To all whom it may concern:*

Be it known that we, JAMES PATERSON and WILLIAM PATERSON, of Stockton, San Joaquin county, State of California, have invented an Improvement in Plows; and we hereby declare the following to be a full, clear, and exact description of the same.

Our invention relates to a machine for plowing; and it consists of a series of concavo-convex disks centrally journaled, so as to turn freely on the ends of arms which project radially from hubs fixed upon a main bearing and driving-shaft, through which power is applied to rotate the arms and the disks, so that the latter enter and leave the soil intermittently.

It further consists in certain details of construction, all of which will be more fully explained by reference to the accompanying drawings, in which—

Figure 1 is a side elevation of our plow. Fig. 2 is an end view of the shaft and disks. Fig. 3 is a side view of part of the shaft and disks. Fig. 4 is a vertical section through one disk. Fig. 5 is a plan view of our machine.

Various devices have been employed in the place of ordinary plows for turning the soil, some consisting of blades mounted spirally upon a shaft, said blades turning continuously in the soil, others consisting of disks mounted on shafts so that their edges turn continuously in the soil, and various modifications of these devices. Our invention differs from these in having a series of independent cup-shaped disks so mounted as to turn freely in the ends of radial arms extending outwardly from the driving-shaft, so that said disks are caused to enter the ground and rotate therein intermittently instead of continuously.

A is a horizontal shaft suitably journaled in bearing-boxes depending from the frame B. Upon the shaft A are fixed a series of hubs, C, having each two or more arms extending radially outward therefrom, and so arranged with relation to each other that a line drawn through the outer ends of these arms forms a spiral surrounding the main shaft A. In the ends of these arms D are formed horizontal journal boxes or bearings, within which the short studs E turn loosely. These studs form the central axes of the concavo-convex or cup-shaped disks F. The studs project from the convex sides of the disks, so that the concave or interior sides are left perfectly smooth or plain.

The operation of the device will then be as follows: The apparatus which carries the main shaft A being drawn over the ground and the shaft caused to rotate by suitably-connected mechanism, the arms D will be carried around the shaft A and the disks F forced into the ground one after the other. As the edges of the disks strike the ground, they commence to rotate about their central studs and continue to turn while they traverse the arc or segment which represents their travel through the ground. They stand at an angle with the line of travel, and consequently the revolving disks turn the soil over in the same manner as would be effected by an ordinary plow. Two or more of the disks may follow each other in the same line of furrow, and the rotary travel of the driving-shaft A may be regulated with relation to the forward movement of the machine to suit the conditions of the work to be done. The frame B, to which the shaft A is journaled, may be connected with a traction-engine or with a horse or other power. In the present case we have illustrated it as driven from the wheels of a traction-engine by means of the endless driving-chain G, which passes around a chain-pulley, H, upon the shaft A, and about another chain-pulley, I, upon the frame B. The frame B, as shown, is connected with the center of the bearing-wheel shaft of the engine, from a pulley on which a chain, J, passes around a pulley upon the shaft I' of the pulley I, and thus drives the shaft A and its disks. As the frame B is journaled upon the same center with the driving-pulley of the chain J, it is manifest that the frame may be raised or depressed about this center without interfering with the action of the driving-chains.

In order to control the disks and the depths to which they may enter the soil, we have shown a plain supporting caster-wheel, K, the vertical shaft of which turns in the corresponding journal-box, L, in the horizontal arm of the bell-crank lever M, which lever is fulcrumed to the frame B, as shown at N. The upper end of the bell-crank lever M is connected with a hand-lever, P, by a connection-rod, O, and through this connection the lever M may be tilted about its fulcrum-pin, and the standard L and wheel K may be raised or depressed, which will allow the plow-disks to enter the soil more or less deeply.

When it is desirable to plow over a considerable width, it is not feasible to mount a sufficient number of disks upon a single continuous shaft. We have therefore shown the frame as made in three sections—a central section directly behind the engine or motor and two side sections hinged on each side of the frame-work, one before and one behind the line of the central one. Each of these side arms or timbers, which we have marked B', for convenience in distinguishing them from the central one, is hinged to the side of the engine or motor frame, as shown at Q. The horizontal shafts A of these two extensions are each provided with driving chain-pulleys H', and these pulleys are driven by chains G' from the same central shaft, I', which carries the pulley I.

It will be seen that three of the pulleys I will be thus fixed to the same shaft, I', at proper points, so that power may be taken from them to drive the plow-shafts A, and the whole of them and their shaft will be driven by the single chain J from the engine or motor.

It will be manifest that the means for driving the shafts may be varied to suit the style of motor or engine which is employed, any equivalent mechanical contrivance being used, and any one or all of the sets of plowing-disks may be raised or depressed, as described for the central one. In the case of the extension B' the supporting caster-wheels K will have their operating-levers at the outer ends, and the handle-levers P being set close to the main frame, an intermediate bell-crank lever, R, and connecting-rod S will be necessary to connect them with the bell-crank levers M. As the studs E project from the convex side of the disks F, the concave sides will be perfectly smooth, and, the arms D following in the wake of the disks, it is capable of being run to the depth of its full diameter, if desired.

It will be seen that the disks carried at the ends of the lever-arms and forced successively and intermittently into the soil will rotate upon their own axes, and by reason of resistance in the soil the power applied from the engine to rotate the driving-shaft A will be returned to a certain extent through the medium of these rotating disks, which help the forward propulsion of the machine by reason of their rotation upon their own axes as they pass through the soil. The greater power exerted upon these plowing-disks the greater assistance will be given to the forward propulsion of the machine.

Having thus described our invention, what we claim as new, and desire to secure by Letters Patent, is—

1. A plowing device consisting of independent disks F, loosely journaled in the ends of arms which radiate from a central driving-shaft and are caused to revolve about said shaft by power applied thereto, substantially as herein described.

2. A series of disks loosely journaled in the ends of radial arms which are fixed to a central driving-shaft and are caused to rotate around it by power applied to said shaft, whereby the rotary disks are caused to travel through the ground with a motion independent of that which rotates the shaft, substantially as herein described.

3. A series of disks loosely journaled by means of central studs in the ends of arms which are fixed to a central shaft and extend spirally around said shaft, a mechanism whereby power may be applied to rotate said shaft, and mechanism whereby the apparatus to which the shaft is journaled is caused to travel along the surface of the ground at a rate of speed independent of that given to the rotary shaft, substantially as herein described.

4. The rotary driving-shaft having the radial arms spirally arranged around it, and a series of disks loosely journaled in the outer ends of said arms, so as to enter the soil successively and intermittently during its rotation, in combination with a mechanism whereby the shaft and disk may be raised or depressed to regulate the depth of cut, substantially as herein described.

5. A vertically-adjustable frame, B, having the disk-carrying driving-shaft A journaled to it, and means for raising and depressing the same, as shown, in combination with the extension-frames B', hinged at each side of the main frame and carrying similar shafts and plowing-disks, said extension-frames having caster-wheels supporting their outer ends, and a bell-crank lever and mechanism whereby they may be raised and depressed, substantially as herein described.

6. The center and jointed extension-frames, B B', having independent disk-carrying shafts journaled to them, each having a chain driving-pulley, H H', in combination with a driving-shaft carrying the pulleys I I', the driving-chains G G', and the main driving-chain J, by which power is transmitted to drive all the shafts and cutters, substantially as herein described.

In witness whereof we have hereunto set our hands.

JAMES PATERSON.
WILLIAM PATERSON.

Witnesses:
W. C. WAGNER,
T. C. MALLON.